(12) United States Patent
Ruden et al.

(10) Patent No.: US 9,718,159 B2
(45) Date of Patent: Aug. 1, 2017

(54) ADAPTIVE FASTENER ACCESS TOOL

(71) Applicant: Seagate Technology LLC, Cupertino, CA (US)

(72) Inventors: Shawn A. Ruden, Shakopee, MN (US); Kevin J. Spiczka, Prior Lake, MN (US); Brad E. Rowell, Plymouth, MN (US)

(73) Assignee: Seagate Technology LLC, Cupertino, CA (US)

( * ) Notice: Subject to any disclaimer, the term of this patent is extended or adjusted under 35 U.S.C. 154(b) by 561 days.

(21) Appl. No.: 14/071,336

(22) Filed: Nov. 4, 2013

(65) Prior Publication Data

US 2015/0127138 A1 May 7, 2015

(51) Int. Cl.
*B23P 19/06* (2006.01)
(52) U.S. Cl.
CPC .................... *B23P 19/06* (2013.01)
(58) Field of Classification Search
CPC .................................................. G05B 19/404
USPC ............................................................ 700/173
See application file for complete search history.

(56) References Cited

U.S. PATENT DOCUMENTS

| 2,632,486 | A | | 3/1953 | Fetsko |
| 3,766,990 | A | | 10/1973 | Eckman et al. |
| 4,853,807 | A | * | 8/1989 | Trager ................... G11B 33/02 360/137 |
| 5,054,588 | A | | 10/1991 | Thorp et al. |
| 5,156,244 | A | | 10/1992 | Pyles et al. |
| 2002/0148299 | A1 | * | 10/2002 | Leong ................... B23P 19/042 73/761 |
| 2011/0090585 | A1 | | 4/2011 | Schwarcz |

* cited by examiner

*Primary Examiner* — Christopher E Everett
(74) *Attorney, Agent, or Firm* — Hall Estill Attorneys at Law

(57) ABSTRACT

A tool may be configured at least with a fastener that can be accessed with a shaped bit. A controller portion of the tool can be arranged to predict bit deflection that enables a tool configuration to be adapted in response to actual bit deflection to conform to the predicted bit deflection.

20 Claims, 4 Drawing Sheets

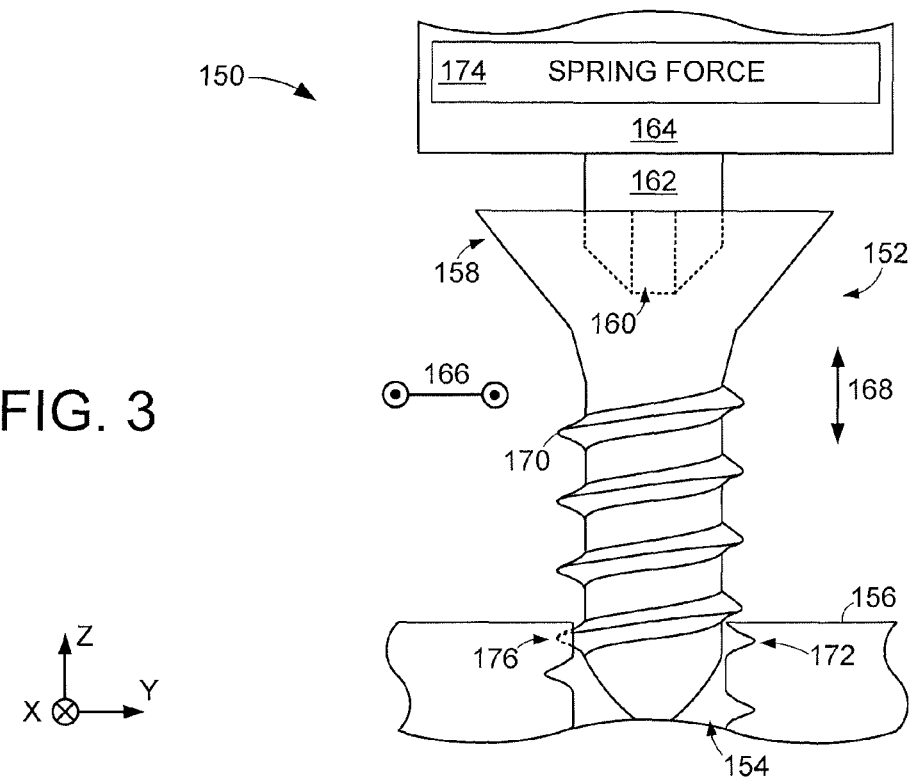

FIG. 3

```
┌──────────────────────────────────────────────────────┐
│ 180      BIT DEFLECTION PREDICTION SCHEME            │
└──────────────────────────────────────────────────────┘
                           │
                           ▼
┌──────────────────────────────────────────────────────┐
│ 182      INPUT FASTENER CHARACTERISTICS              │
└──────────────────────────────────────────────────────┘
                           │
                           ▼
┌──────────────────────────────────────────────────────┐
│ 184    PREDICT BIT AND FASTENER POSITION OVER TIME   │
└──────────────────────────────────────────────────────┘
                           │
                           ▼
┌──────────────────────────────────────────────────────┐
│ 186         LOG MEASURED ACTUAL BIT                  │
│             AND FASTENER CHARACTERISTICS             │
└──────────────────────────────────────────────────────┘
                           │
                           ▼
┌──────────────────────────────────────────────────────┐
│ 188         ADJUST PREDICTION ALGORITHM              │
│         IN VIEW OF ACTUAL CHARACTERISTICS            │
└──────────────────────────────────────────────────────┘
```

FIG. 4

ADAPTIVE FASTENER ACCESS TOOL

SUMMARY

Various embodiments may configure a tool with at least a fastener that can be accessed with a shaped bit. A controller portion of the tool can be arranged to predict bit deflection that enables a tool configuration to be adapted in response to actual bit deflection to conform to the predicted bit deflection.

BRIEF DESCRIPTION OF THE DRAWINGS

FIG. 3 displays a block representation of a portion of an example fastening assembly constructed and operated in accordance with various embodiments.

FIG. 4 provides an example bit deflection prediction scheme that may be carried out in accordance with various embodiments.

DETAILED DESCRIPTION

Reduced physical dimensions of various computing devices, such as a hard disk drive, can correspond with increased sensitivity to operational deviations like the presence of contaminating particulates. While contaminates can be mitigated during formation of various computing components, such as controllers and magnetic sensors, assembly of the various computing components into a functioning drive can be a source of contaminates in the event fastening means are installed or removed improperly. For example, imprecise removal of a screw or bolt fastener can result in a thread of the fastener being damaged and the resulting particulates contaminating proximal computing components.

Such production of contaminates that may jeopardize performance of a computing device has rendered a tool that accesses a fastener with a shaped bit and has a controller arranged to predict bit deflection and adapt a tool configuration in response to actual bit deflection to conform to the predicted bit deflection. The ability to adapt one or more tool configurations to conform to the predicted bit deflection can reduce and eliminate traumatic fastener impacts that produce contaminating particulates. For example, tool configuration adaptations like increasing Z-axis velocity, reducing torque, and engaging a fastener removal mechanism can facilitate the removal of the fastener with no traumatic actions or generation of contaminating particulates. Adaptive fastener control additionally allows for fastener removal optimized for increased efficiency, accuracy, and speed with heightened precision.

Figure 1:
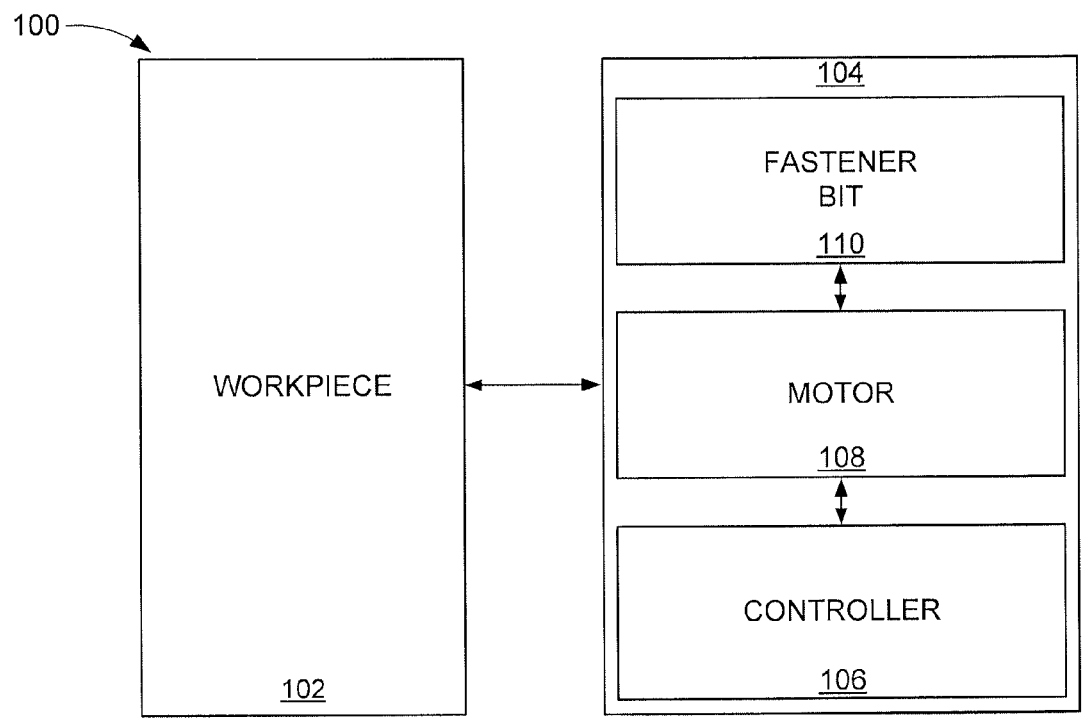
FIG. 1 is a block representation of a portion of an example tool system configured in accordance with various embodiments.

FIG. 1 provides a functional block representation of an example tool system 100 capable of engaging and controlling portions of a workpiece 102 with at least one tool 104. The material, size, shape, and operational characteristics of the workpiece 102 is unlimited and can comprise any number of layers and separate components that are permanent or temporary to allow the workpiece 102 to be used in its predetermined function. For example, the workpiece 102 may be configured as an assembly of two separate components attached via at least one fastener to allow the workpiece 102 to be utilized as a sealed or unsealed case that may house any variety of electrical and mechanical materials.

During manufacture, maintenance, normal operation, and unique operation, the workpiece 102 can be attached and unattached through the articulation of one or more fasteners with the tool 104. While the tool 104 can be configured with any number of internal and external electrical and mechanical aspects, various embodiments construct the tool 104 with an electrical controller 106 that is connected to and controls at least one motor 108 and a fastener bit 110 to allow a fastener to be installed or removed from the workpiece 102. The tool 104 can be constructed with a variety of different interchangeable aspects, such as the fastener bit 110, that allows the tool 104 to be adapted for use in engaging and controlling various types of fasteners, such as screws, bolts, rivets, magnets, ties, adhesives, and nails.

Figure 2:
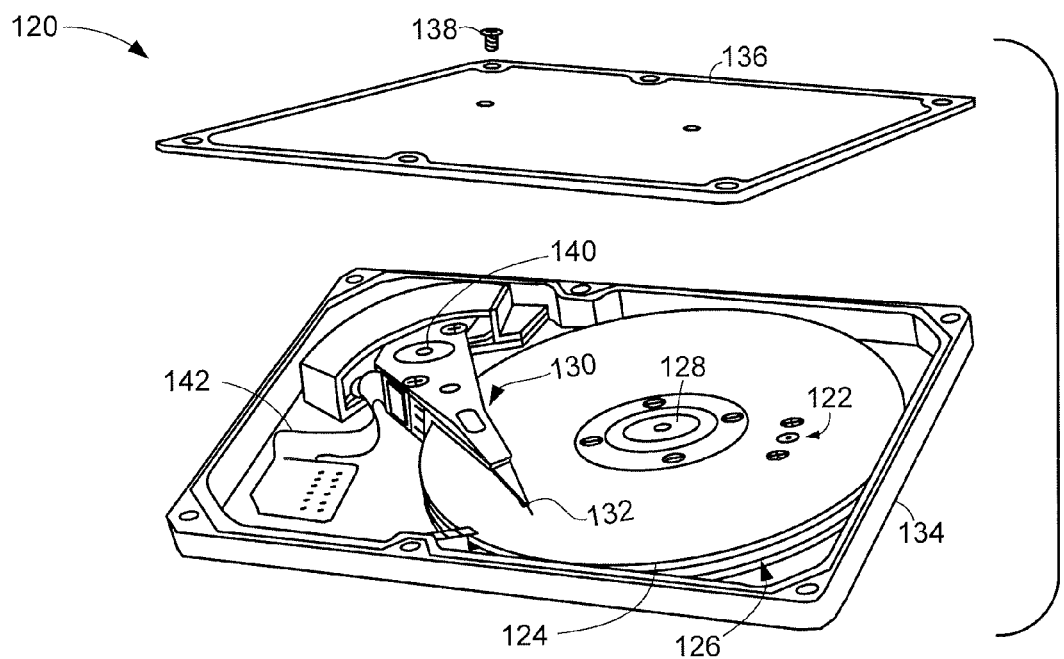
FIG. 2 shows an isometric block representation of a device capable of being used in the tool system of FIG. 1.

FIG. 2 illustrates a perspective view block representation of an example workpiece 120 that may be employed in the tool system 100 of FIG. 1 during manufacture, maintenance, and operation in accordance with various embodiments. The workpiece 120 can be configured as a data storage device, which can be a hard disk drive, hybrid drive, and solid-state drive. As shown, the data storage device has an example rotating data storage environment where magnetic data bits 122 are organized on one or more data storage media 124 of a media stack 126. Through controlled rotation of the media stack 126 via a central spindle motor 128, an actuating assembly 130 can float on an air bearing to allow one or more data transducing means, such as a data bit sensor or writer, residing individually or together on a suspended transducing head 132 to access selected data bits 122.

Although the data storage device workpiece 120 can be constructed in an unlimited variety of manners, various embodiments manufacture constituent components separately and subsequently assemble the assorted components into a functioning data storage device. Such assembly of various components may take place in a single location or in a number of different locations. In the event multiple locations are used, one or more components can be installed into the device housing 134 before the top cover 136 is attached to the housing 134 via at least one fastener 138 and the device 120 is transported to another location. For instance, the actuating assembly 130 can be mechanically and electrically attached to a voice coil motor 140 prior to the housing 134 being closed and shipped to a different location that removes the fasteners 138 and top cover 136 before installing and connecting a flexure 142 with a control board as part of a printed circuit board assembly portion of the device.

Regardless of whether the various constituent components of the data storage device workpiece 120 are assembled in one or more locations, completion of the assembly will result in the housing 134 being sealed by the top cover 136 by a plurality of fasteners 138. The frequent or infrequent installation and removal of one or more fasteners 138 can pose a risk of generating contaminating particulates if the fasteners 138 are not precisely accessed.

FIG. 3 generally illustrates a cross-sectional block representation of a portion of an example workpiece 150 that may generate contaminating particulates in various embodiments. The workpiece 150 is configured with a screw fastener 152 engaging a fastener orifice 154 of a substrate 156. The screw fastener 154 has a head 158 that contains a bit socket 160, such as a phillips, torx, allen, and flat notch, that can be partially or completely engaged by a tool bit 162, such as fastener bit 110 of FIG. 1, shaped to match the bit socket 160. The tool bit 162 can be part of a fastening tool 164 that selectively rotates, as shown by line 166, and along the Z-axis, as shown by line 168, to mate the fastener threads 170 with the orifice threads 172 of the fastener orifice 154.

While not required or limiting, the screw fastener 152 can be configured with angled threads 170 that respectively pull or push the head 158 towards or away from the substrate 156. Such fastener thread 170 construction can correspond with efficient thread alignment, but can pose difficulties during screw fastener 152 removal and installation where the fastener threads 170 and tool 164 are each moving along the Z-axis at different velocities. In view of such difficulties, the tool 164 may be constructed with a spring force mechanism 174, such as a mechanical spring, that pushes the bit 162 into consistent engagement with the bit socket 160 even if the tool 164 and screw fastener 152 are moving along the Z-axis at different velocities.

The presence and use of the spring force mechanism 174 can increase the speed of screw fastener 152 removal due to increased contact between the bit 162 and socket 160, but can inadvertently push the screw fastener 152 into engagement with one or more orifice threads 172 after the fastener threads 170 are completely unthreaded. It should be noted that the term completely unthreaded is hereby meant as all of the fastener threads 170 being vertically offset along the Z-axis from all the orifice threads 172, regardless of whether the respective threads 170 and 172 are in contact.

In accordance with various embodiments, the spring force mechanism 174 maintains contact between the fastener 170 and orifice threads 172 after the screw fastener 152 is completely unthreaded. Such contact in combination with rotation of the screw fastener 152 in an unthreading direction, such as counter-clockwise, can force the fastener thread 170 to override the orifice thread 172 in a traumatic action 176 that can produce a "snap" sound and generate particulates as substrate 156 and fastener 152 material is removed. It can be appreciated that continued rotation of the screw fastener 152 and forcible engagement due to the spring force mechanism 174 can repeat the traumatic action 176 with consequentially increasing amounts of contaminating particulates being produced that can jeopardize the construction and operation of a workpiece like the data storage device 120 of FIG. 2.

It is contemplated that separation of the completely unthreaded screw fastener 152 and the fastener orifice 154 can allow the spring force mechanism 174 to release without forcing the unwanted thread 170 engagement and potential traumatic action 176 of threads overriding. However, relying on human operators to separate the screw fastener 152 and orifice 154 upon complete unthreading can be unreliable, especially with high fastener 152 rotational velocities that can accompany large scale manufacturing operations. Sensing models that utilize one or more real-time sensors in an attempt to identify complete unthreading can be plagued by system noise and process variation that falsely identifies the relationship between the screw fastener 152 and fastener orifice 154.

Accordingly, measured fastener 152 characteristics can be compared to a predicted fastener removal, or installation, model to more accurately identify when the screw fastener 152 is completely unthreaded and adapt the tool 162 to prevent the traumatic action 176 from occurring. FIG. 4 provides an example bit deflection prediction scheme 180 that can be carried out in accordance with various embodiments to forecast assorted characteristics of fastener removal and installation, such as rotational position, vertical position, bit location, and amount of thread remaining. The scheme can begin by inputting at least one fastener characteristic into the controller in step 182. As a non-limiting example, the diameter, length, thread pitch, socket shape, and substrate material may all be entered manually or automatically into a controller of one or more tools that are each configured to engage screw fasteners with adaptive torque, rotational speed, and Z-axis velocity.

With at least one fastener characteristic inputted into a tool controller, step 184 proceeds to compute one or more fastener removal scenarios over time that predicts at least bit and fastener rotational and vertical position. Various embodiments utilize step 184 to compute a variety of different removal scenarios with varying bit rotational speeds, torques, and Z-axis velocities to allow for near immediate adaptation to real-time actual measured bit and fastener characteristics to induce bit deflection behavior, as provided by a spring force mechanism of a tool, and adherence of the actual fastener removal to one or more predicted scenarios where no thread overriding traumatic actions occur. In other words, step 184 can utilize several removal scenarios that correct actual bit and fastener position and movement to conform to a predetermined predicted removal scenario where no traumatic actions happen.

The prediction of bit and fastener position allows each tool to selectively engage and control the removal, or installation, of a screw fastener at will. Step 186 can continuously, sporadically, and randomly log the actual bit and fastener characteristics. For example, step 186 can log if the bit is engaged, the bit's position, number of fastener threads remaining, and tool velocity by activating one or more sensors, such as a proximity, video, vibration, magnetic, and thermal sensors. The data pertaining to the actual bit and fastener characteristics can subsequently be utilized in step 188 to adjust one or more prediction algorithms used in step 184 to predict the bit and fastener position over time. That is, step 188 can continually optimize at least one prediction algorithm used in step 184 by implementing some or all of the data logged in step 186.

Figure 5:
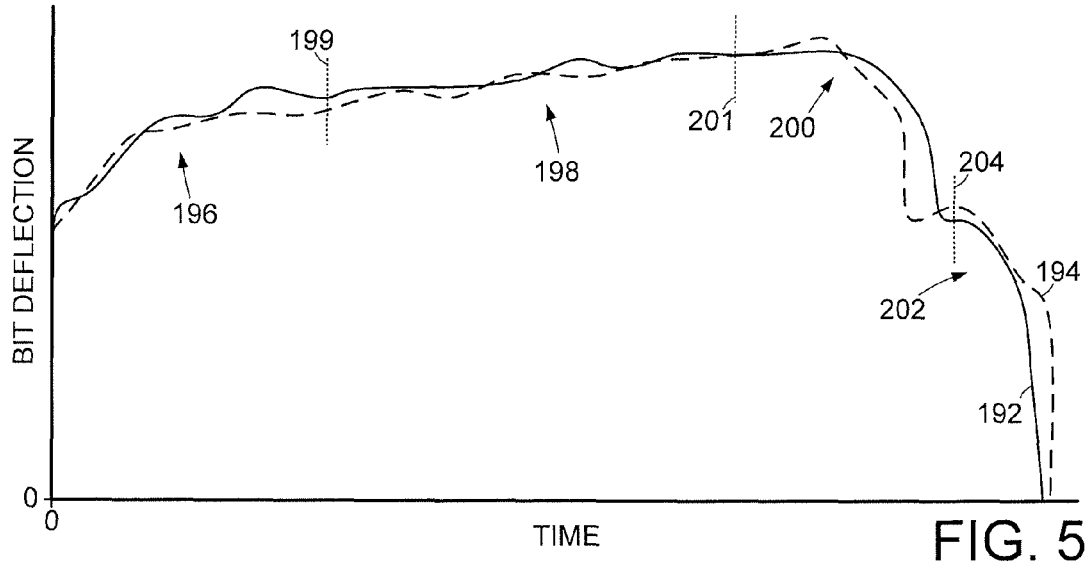
FIG. 5 plots operational data corresponding to an example tool system operated in accordance with various embodiments.

Through the prediction of bit and fastener characteristics, measured bit and fastener variables can be adjusted to conform to a forecasted scenario where traumatic actions do not occur. FIG. 5 plots operational data for an example tool system constructed and operated in accordance to various embodiments, such as, but not limited to, the bit deflection prediction scheme 180 of FIG. 4. Solid line 192 corresponds to continuously measured actual bit deflection over time while segmented line 194 represents a predicted bit deflection model over time. It should be noted that bit deflection is hereby meant as the amount of Z-axis movement of a tool bit against a spring force mechanism, such as the mechanism 174 of FIG. 3.

The predicted 194 and actual 192 models illustrate how bit deflection can be used by a controller to understand a variety of bit and fastener characteristics. Region 196 corresponds to an increased bit deflection as the bit mates with the socket of the fastener. As the controller identifies the actual bit deflection is varying from the predicted bit deflection in region 198, as differentiated by segmented line 199, the controller can adapt the bit characteristics, such as rotational and Z-axis velocity, to conform to the predicted bit deflection model 194. In various embodiments, region 198 corresponds to the controller varying the Z-axis velocity of the fastener to match the unthreading speed dictated by the pitch of the fastener threads.

Region 200 represents where fastener and fastener orifice are becoming disengaged as complete unthreading of the respective threads. The monitoring of actual bit deflection exclusively can attempt to trigger a fastener removal condition with increased Z-axis velocity when bit deflection transitions from region 198 to region 200, as indicated by segmented line 201, but the identification of such a triggering transition can be difficult and imprecise due to process and system noise. Thus, it can be appreciated that the adaptation of the measured actual bit deflection model 192 with respect to the predicted bit deflection model 194 allows region 200 to be less susceptible to noise and the controller to more intelligently adapt bit and fastener characteristics to ensure a traumatic action does not occur in region 202, as differentiated from region 200 by segmented line 204, where the fastener is fully removed from the fastener orifice.

Figure 6:
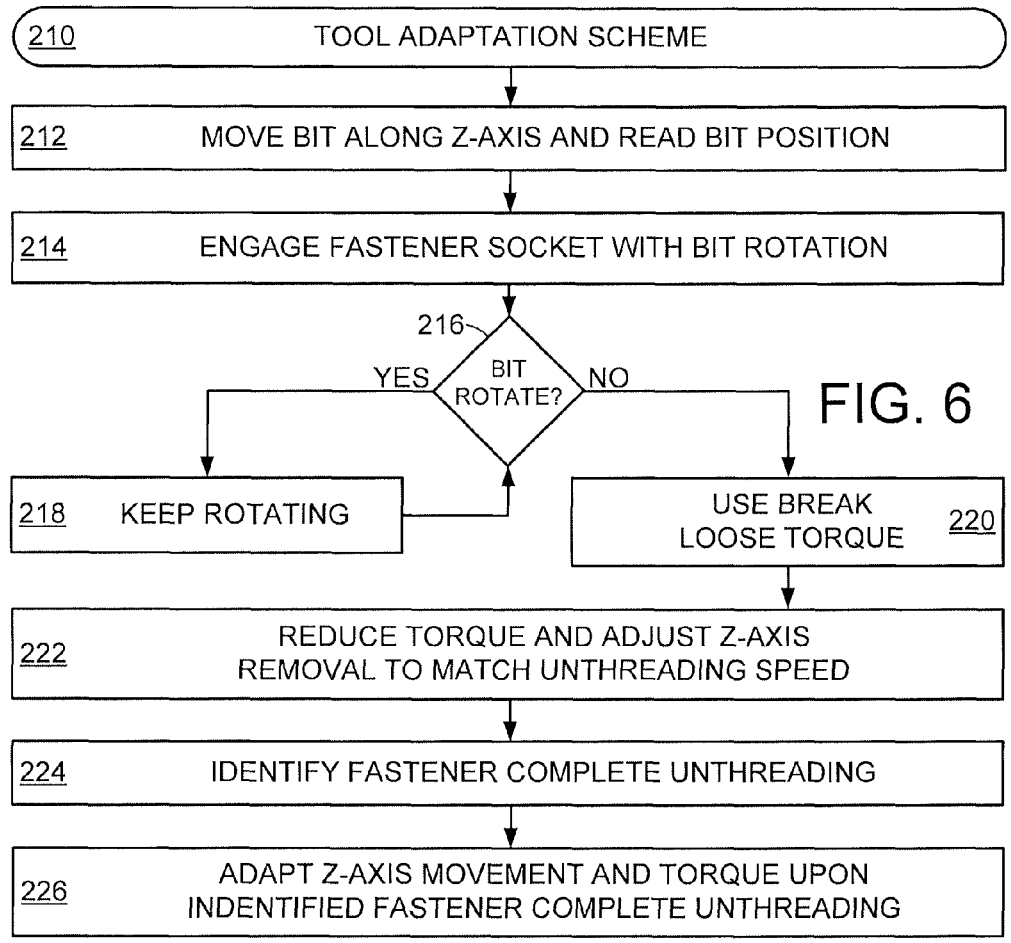
FIG. 6 is a flowchart of an example tool adaptation scheme carried out in accordance with various embodiments.

FIG. 6 provides an example tool adaptation scheme 210 that can be conducted in various embodiments to utilize a predicted bit deflection model to optimize fastener removal or installation into a fastener orifice. Scheme 210 may begin with any action or decision, but in the non-limiting embodiment shown in FIG. 6, step 212 begins by moving a tool bit along the Z-axis towards a fastener while reading the bit's position. Step 212 may initialize assorted variables, such as peak current, and translate the tool bit at one or more predetermined speeds, like 60 mm per second, and accelerations, like 2500 mm per second per second. The reading of the tool bit's position in step 212 may involve continuous and sporadic comparison with predetermined bit deflection and timeout thresholds to determine when to slow and stop the Z-axis movement to allow the tool bit to engage the fastener socket.

With step 212 positioning the tool bit in proximity with a fastener and fastener socket, step 214 can proceed to engage the fastener socket, which may or may not involve rotating the tool bit about the Z-axis. Various embodiments may inject a step between steps 212 and 214 that mates the tool bit with the fastener bit socket with increased precision by adapting tool bit toward the socket one thread pitch at a time. Such heightened precision can reduce system shock when the tool bit contacts the fastener and can be implemented as a stand-alone scheme step or as part of step 214.

Regardless of the precision used to mate the tool bit and bit socket, step 214 may induce a predetermined initial bit deflection, such as 0.25 mm, that maintains tool bit engagement with the fastener during fastener rotation. The mating of tool bit and fastener bit socket can occur during tool bit rotation, but decision 216 evaluates if tool bit rotation is to continue. In the event the tool bit is not properly aligned, seated, and mated with the fastener bit socket, decision 216 activates step 218 to keep rotating the tool bit in a predetermined direction, such as clockwise, before returning to decision 216.

Decision 216 can advance scheme 210 upon the tool bit being satisfactorily engaged with the bit socket, which may correspond to the tool bit being resisted from rotation by the fastener. The proper engagement of the tool bit and fastener can then trigger step 220 to adapt to the heightened resistance of the fastener by using a predetermined break loose torque until step 222 reduces the torque to allow more precise fastener unthreading. Various embodiments do not actively reduce torque, but instead limits current to the tool motor on the fly to follow a predetermined bit velocity that may vary after the fastener is initially loosened in step 220.

Step 222 may further adapt Z-axis velocity to match the unthreading speed, which may or may not coincide with the unthreading speed predicted by a bit deflection model. The adaptation of the tool to the torque, removal velocity, and bit deflection can allow step 224 to identify when the fastener is completely unthreaded with increased accuracy in conjunction with the predicted bit deflection model.

The identification of complete fastener unthreading in step 224 may or may not be verified before step 226 adapts the tool for fastener removal to ensure no traumatic actions occur. As a non-limiting example, step 226 can increase Z-axis velocity, reduce torque, and engage a fastener removal mechanism, such as a vacuum, to facilitate the removal of the fastener with no traumatic actions or generation of contaminating particulates. The tool adaptation scheme 210 may be used alone or in combination with the prediction scheme 180 to optimize fastener engagement, installation, and removal. However, the ability to compare predicted and actual measured bit deflection models can provide additional fastener access capabilities.

Figure 7:
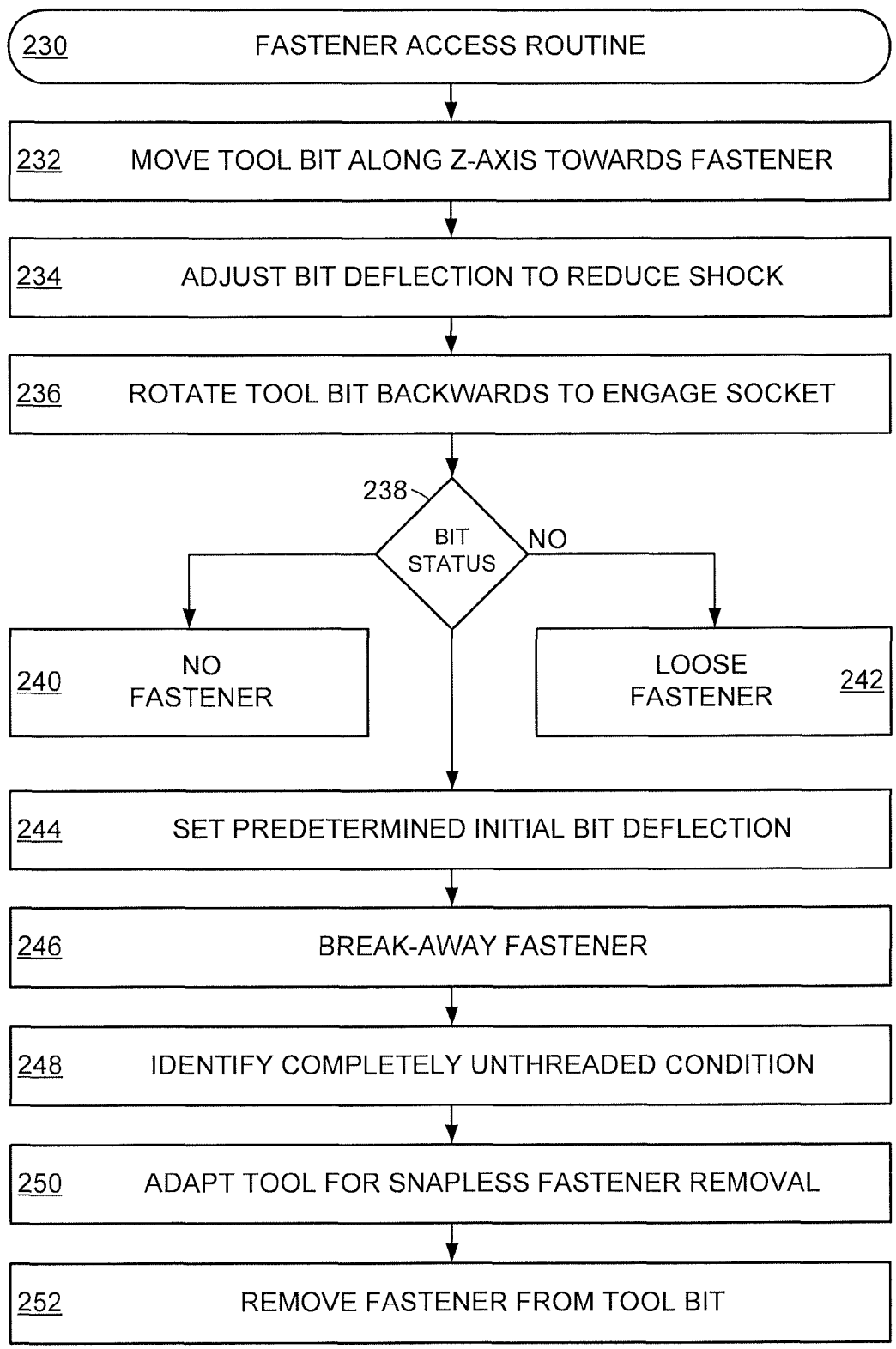
FIG. 7 provides an example fastener access routine conducted in accordance with various embodiments.

FIG. 7 conveys an example fastener access routine 230 that may be carried out in accordance with various embodiments to provide optimized fastener engagement and control. Initially, a tool and attached tool bit is moved in step 232 towards a fastener along a Z-axis, which is aligned along the longitudinal axes of the fastener and tool bit. Contact between the fastener and tool bit as a result of step 232 can induce large bit deflection that spontaneously shocks the tool and fastener when the bit drops into the bit socket of the fastener. To mitigate such shock, step 234 can adapt the tool's position and consequently the bit deflection to a predetermined value, such as 0.25 mm, before the tool and tool bit are rotated backwards in step 236 so that the tool bit engages the bit socket.

During and after step 236 decision 238 can evaluate the status of the tool bit. While not limiting, decision 238 can identify that no fastener is present in step 240 by recognizing that the bit deflection has not increased during steps 232-236. Decision 238 can alternatively identify that a screw is loose in step 242 by recognizing the tool bit position has increased greater than a predetermined percentage, such as 25%, of the fastener's thread pitch. Decision 238 may also adapt the tool's torque to verify that step 236 resulted in proper tool bit and socket engagement as a result of the tool bit's rotation being reduced or minimized by the fastener.

With decision 238 identifying that the tool bit and fastener are in proper condition for removal, step 244 can then set a predetermined initial bit deflection that corresponds with increased bit deflection and pressure from the tool to the fastener socket via the tool bit. That is, step 244 can utilize spring force to increase the downward pressure on the tool bit to ensure the tool bit does not slip or damage the bit socket, which can generate unwanted contaminating particulates. The increased tool bit pressure onto the fastener can aid in breaking the fastener loose from the fastener orifice in step 246 with a tool bit torque that is adapted to ensure loosening, but not damage to the fastener or fastener orifice, which could also generate unwanted contaminating particulates.

The loosening of the fastener in step 246 allows the tool to adapt to an unthreading condition, such as changing tool torque and Z-axis velocity, which results in a completely unthreaded condition that is identified in step 248 by the tool controller. Step 248 can utilize one or more bit deflection prediction models to forecast and confirm a completely unthreaded condition via the measured actual bit deflection values that are logged by the controller. Concurrently and subsequently with step 248, step 250 can adapt the tool and tool bit for fastener removal that minimizes the risk of traumatic actions, like threads overriding on another and producing a snapping sound.

Removal of the fastener from the fastener orifice without a traumatic action in step 250 can then allow the fastener to be removed from the tool bit in step 252 without generating contaminating particulates. While various manners can be used to remove the fastener from the tool, various embodiments utilize magnets and suction either individually or in combination to dislodge the tool bit from the fastener socket without the fastener contacting the fastener orifice. It should be noted that while the fastener access routine 230 can provide optimized fastener removal, the various aspects shown in FIG. 7 are not required and the steps and decision can be removed and modified just as additional steps and decisions can be added at will.

Through the utilization of a predicted bit deflection model in combination with measured actual bit deflection, fastener access can be optimized for speed and cleanliness. The continued optimization of the bit deflection prediction algorithm with logged actual bit deflection measurements continually optimizes the prediction of fastener and tool bit behavior at different times throughout the engagement and removal of the fastener from a fastener orifice. Moreover, the ability to adapt tool bit characteristics, like torque and velocity, at various points during fastener removal that are identified and verified by the predicted bit deflection model can ensure traumatic actions are prevented and contaminating particulates are not generated, which allows the fastener removal process to be completely automated to eliminate human error from generating contaminating particulates.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. A method comprising:
accessing a fastener with a shaped bit of a tool;
arranging a controller portion of the tool to predict bit deflection;
sensing a deviation from the predicted bit deflection in an actual bit deflection;
adapting a tool configuration in response to the sensed deviation to conform actual bit deflection to the predicted bit deflection;
identifying complete unthreading of the fastener; and
changing at least one tool operating parameter in response to the identified fastener unthreading to prevent trauma to the fastener.

2. The method of claim 1, wherein the predicted bit deflection models bit deflection over time.

3. The method of claim 1, wherein a plurality of different bit deflection models are predicted and used to identify the complete unthreading of the fastener.

4. The method of claim 1, wherein the actual bit deflection is compared to the predicted bit deflection to predict fastener installation fault.

5. The method of claim 1, wherein the actual bit deflection utilizes measured real-time fastener and bit activity.

6. The method of claim 1, wherein the actual bit deflection identifies a loose fastener.

7. The method of claim 1, wherein the actual bit deflection identifies a missing fastener.

8. The method of claim 1, wherein the adapted tool configuration as Z-axis velocity as measured along the longitudinal axis of the fastener.

9. The method of claim 1, wherein the adapted tool configuration is torque about a longitudinal axis of the fastener.

10. The method of claim 1, wherein different first and second tool operating parameters are changed in response to the identified complete unthreading of the fastener.

11. The method of claim 10, wherein the first tool operating parameter is Z-axis velocity and the second tool operating parameter is torque.

12. An apparatus comprising:
a tool with a bit shaped to access a fastener; and
a controller portion of the tool arranged to predict bit deflection, sense a deviation from the predicted bit deflection in an actual bit deflection, adapt a tool configuration in response to the sensed deviation to conform the actual bit deflection to the predicted bit deflection, identify complete unthreading of the fastener, and change at least one tool operating parameter in response to the identified fastener unthreading to prevent trauma to the fastener.

13. The apparatus of claim 12, wherein the fastener attaches portions of a hard disk drive.

14. A method comprising:
predicting fastener deflection with an initial prediction algorithm in view of at least one fastener characteristic as directed by a controller;
accessing a fastener with a shaped bit of the tool;
logging measured actual fastener deflection with the controller;
sensing a deviation from the predicted fastener deflection in the measured actual fastener deflection;
adapting a tool configuration in response to the sensed deviation to conform measured actual fastener deflection to the predicted fastener deflection during removal of the fastener;
adjusting the initial prediction algorithm with the controller in view of the sensed deviation to a derived prediction algorithm;
identifying complete unthreading of the fastener;
changing at least one tool operating parameter in response to the identified fastener unthreading to prevent trauma to the fastener; and
engaging a fastener removal mechanism when the fastener is identified as completely unthreaded.

15. The method of claim 14, wherein the adapting of the tool configuration prevents the fastener from overriding a portion of a corresponding fastener orifice.

16. The method of claim 15, wherein the fastener comprises a screw, the fastener orifice is a threaded aperture, and the portion is a thread of the fastener orifice.

17. The method of claim 15, wherein comparison of the predicted and measured actual fastener deflection identifies the fastener overriding the portion of the corresponding fastener orifice.

18. The method of claim 14, wherein the Z-axis velocity of the bit along a longitudinal axis of the bit is adapted to match an unthreading speed dictated by the fastener's removal.

19. The method of claim 14, wherein comparison of the predicted and measured actual fastener deflection identifies completed removal of the fastener.

20. The method of claim 19, wherein the fastener is separated from a fastener orifice upon identification of completed removal of the fastener to ensure the fastener does not experience trauma that produces contaminating particulates.

* * * * *